J. C. MELOON.
CLAMPING MECHANISM.
APPLICATION FILED DEC. 18, 1905.
971,771.
Patented Oct. 4, 1910.
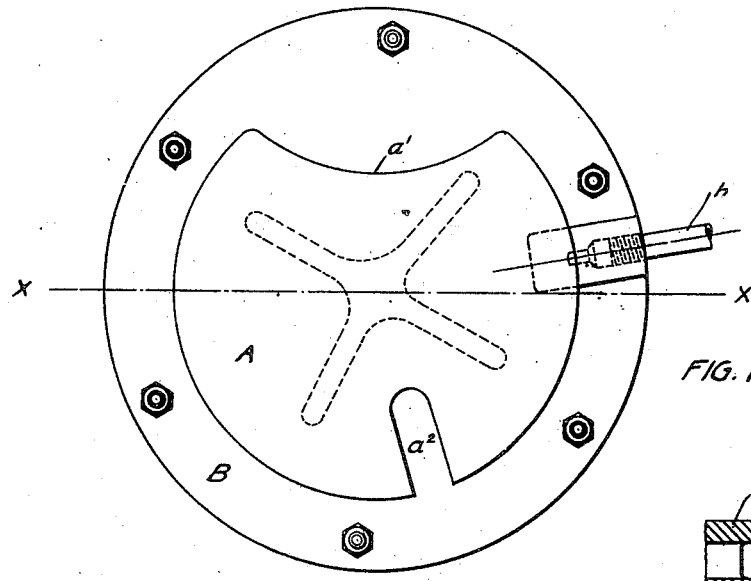
FIG. 1.
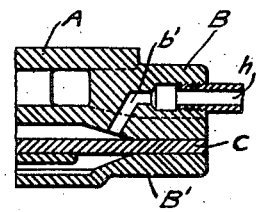
FIG. 5.
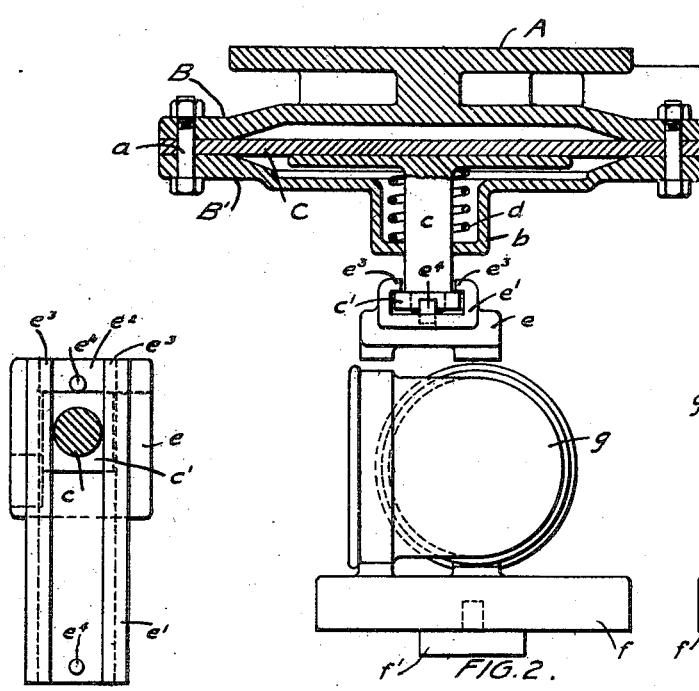
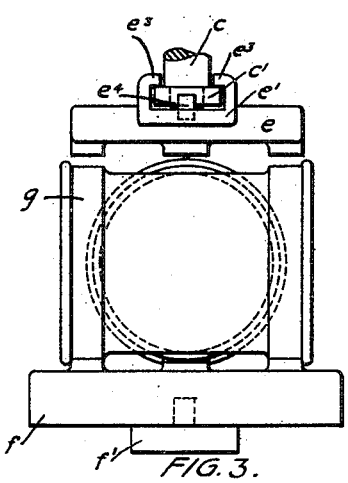
WITNESSES,
Catherine G Bradley
James H. Thurston
INVENTOR,
Jonathan C. Meloon,
BY Wilmarth H. Thurston
ATTY.
THE NORRIS PETERS CO., WASHINGTON, D. C.

UNITED STATES PATENT OFFICE.

JONATHAN C. MELOON, OF PROVIDENCE, RHODE ISLAND, ASSIGNOR TO GENERAL FIRE EXTINGUISHER COMPANY, OF NEW YORK, N. Y., A CORPORATION OF NEW YORK.

CLAMPING MECHANISM.

971,771. Specification of Letters Patent. Patented Oct. 4, 1910.

Application filed December 18, 1905. Serial No. 292,276.

*To all whom it may concern:*

Be it known that I, JONATHAN C. MELOON, of the city and county of Providence and State of Rhode Island, have invented certain new and useful Improvements in Clamping Mechanisms; and I do hereby declare the following specification, taken in connection with the accompanying drawings, forming a part of the same, to be a full, clear, and exact description thereof.

The invention relates to a machine attachment for holding or clamping the work while being operated upon by the machine, and is more particularly adapted as an attachment for a tapping machine of the character of that shown in Letters Patent No. 311,311, for holding pipe fittings while being tapped.

In the tapping machine of the prior patent referred to the pipe fitting is clamped between two jaws, one fixed and the other movable, the movable jaw being operated to clamp and unclamp the fitting by means of a hand-wheel. It is necessary that the fitting should be firmly clamped, and to accomplish this with this hand-wheel arrangement required the exertion of considerable power on the part of the operator. In addition to setting up the hand-wheel to clamp the fitting, it was necessary for the operator to operate the hand-wheel in the reverse direction in order to unclamp and release the fitting, and when the movable clamp had been set up firmly, as it should be, considerable power was also required to start the hand-wheel in the opposite direction. Frequent repetition of this operation of clamping and unclamping, as successive fittings were introduced and removed from the machine, was tiresome and exhausting and was particularly severe upon the hands of the operator.

The object of the present invention is to provide a convenient means for operating the movable jaw to clamp and unclamp the fittings and one which may be quickly and easily operated.

To that end one feature of the invention consists in providing means whereby said movable jaw may be operated to clamp the fitting by means of a fluid under pressure, and a further feature of the invention consists in providing means whereby the movable jaw will be automatically unclamped when the fluid pressure is released.

As the clamping mechanism which forms the subject of the present invention may be employed in connection with any suitable tapping machine, or in fact with other machines, if desired, it has not been deemed necessary to show or describe the machine itself.

For the purposes of this specification it may be assumed that the clamping mechanism is to be employed in a tapping machine of the character of that shown in the prior patent referred to in place of the hand-operated clamp therein shown.

Referring to the drawings, Figure 1 is a plan view of the attachment; Fig. 2 is a section of the same on line *x—x* of Fig. 1, and showing the movable and fixed jaws with an elbow fitting between them; Fig. 3 shows the movable and fixed clamping jaws with a T-fitting between them; Fig. 4 is a top view of the movable jaw shown in Fig. 2; and Fig. 5 is a detail showing the fluid-pressure connection.

A is a plate by means of which the attachment may be secured in place in the machine. Secured to or formed integral with the plate A is a disk B, to which a companion disk B' is secured by means of bolts *a*. The disks B B' are formed so as to provide a suitable chamber between them, and located in this chamber is a yielding diaphragm C, which may be of any suitable material, the periphery of said diaphragm being clamped between the disks, as shown in Fig. 2.

Secured to the diaphragm C is a plunger *c* which extends through and beyond the disk B'. The disk B' is provided with a central enlargement or extension *b* forming a supplemental chamber in which is located a spiral spring *d*, one end of said spring bearing against the flange of the plunger *c* and the other end bearing against the wall of the chamber.

The outer end of the plunger *c* is provided with a square flanged head *c'* on which the movable clamping jaw is detachably and adjustably mounted.

*f* is the fixed clamping jaw, said fixed jaw being provided with a central boss *f'* adapted to enter a corresponding recess in the frame of the machine, whereby said fixed jaw is properly located and held in place.

$g$ is the pipe fitting shown as resting on the fixed jaw and adapted to be clamped in position by the movable jaw.

The movable jaw $e$ is provided with an extension $e'$, and an undercut recess $e^2$ extends throughout the length of said movable jaw and the extension thereof, said recess being adapted to receive the flanged head $c'$ of the plunger $c$, and the overhanging portions $e^3 e^3$ serving to support the movable jaw on said flanged head. As will be seen, the construction is such that the movable jaw may be slid backward and forward on the plunger head and so that said movable jaw may be moved into position above the fitting, or may be moved away from such position to permit the removal of the fitting and the insertion of a new one. Pins $e^4 e^4$ serve to limit the movement of the movable jaw in either direction. One of these pins is made removable so that the movable jaw may be removed from the flanged head $c'$ and another jaw substituted in its place, as when a different form of fitting is to be tapped.

Different forms of fittings require that the upper jaw shall be differently located with relation to the lower jaw. Thus in Fig. 3, which shows a T-fitting to be clamped, the movable jaw should be located centrally with relation to the fixed jaw, as shown, while in Fig. 2, which shows an elbow fitting, the movable jaw should be located at one side of the center of the fixed jaw, as shown. To provide for thus changing the location of the movable jaw with relation to the fixed jaw, the plate A is preferably cut away on one side, as shown at $a'$ and is provided with a slot $a^2$, whereby said plate and the attachment as a whole may be changed in position with relation to the clamping bolts (not shown), by means of which the attachment is secured in position in the machine.

The disk B is provided with an orifice $b'$ with which the pipe $h$ communicates, and through which the fluid under pressure is conducted to the chamber between the disks B B' and above the diaphragm C. To permit the movement of the attachment for the purpose of adjusting the position of the movable jaw with relation to the fixed jaw, a hose or other flexible connection may be employed for conducting the fluid under pressure to the pipe $h$.

The operation of the clamping mechanism above described is as follows: Assuming the movable jaw to have been moved out of its position above the fixed jaw, the fitting is placed in position on the fixed jaw, and the movable jaw then moved to its proper position above the fitting. The fluid under pressure, preferably compressed air, is then admitted through the pipe $h$, and acting on the diaphragm C forces said diaphragm, with its plunger and the movable jaw carried thereby, downward and into firm contact with the fitting, thereby securely clamping and holding the fitting in place while it is being operated upon. Preferably, instead of having the flanged head of the plunger bear against the movable jaw to force the same against the fitting, the plunger or the reduced end thereof is constructed to project through the flanged head, so that this projecting end of the plunger bears against the movable jaw to force it against the fitting.

When the fitting has been tapped the pressure of the fluid on the diaphragm is released and the spring $d$, which has been under tension by the downward movement of the diaphragm, will immediately and automatically return the diaphragm to its normal position, thereby raising the movable jaw away from the fitting and unclamping the same. The movable jaw is then slid along on the flanged head of the plunger to remove the jaw from its position above the fitting and so that the fitting may be removed and another put in its place.

As will be seen, the only manual operation required in clamping and unclamping the fitting is merely the turning of a valve or cock to admit the fluid under pressure to act upon the diaphragm and to release the same. It will be further seen that the operations of clamping and unclamping the fitting will be quickly and efficiently performed and with practically no labor on the part of the operator.

It will be understood that in place of the diaphragm shown a piston might be employed for operating the movable jaw, and that in such case the fluid-pressure chamber would be in the form of a cylinder for such piston.

What I claim as my invention and desire to secure by Letters Patent is:

1. A clamping mechanism comprising a chamber, a plunger extending out from said chamber, said plunger being provided with a rectangular flanged head, and a clamping jaw mounted on and laterally movable with relation to said flanged head, substantially as described.

2. A clamping mechanism comprising a chamber, a plunger extending out from said chamber, said plunger being provided with a rectangular flanged head, and a clamping jaw mounted on said flanged head, the end of the plunger projecting through said flanged head and adapted to bear against said clamping jaw, substantially as described.

3. A clamping mechanism comprising a chamber, a plunger extending out from said chamber, said plunger being provided with a rectangular flanged head, and a clamping jaw provided with an undercut recess adapted to receive the flanged head of said plunger, substantially as described.

4. A clamping mechanism comprising a chamber, a plunger extending out from said chamber, said plunger being provided with a rectangular flanged head, and a clamping jaw provided with an extension with an undercut recess formed in said jaw and extension and adapted to receive the flanged head of said plunger, substantially as described.

5. A clamping mechanism comprising a chamber, a plunger extending from said chamber, said plunger being provided with a rectangular flanged head, a clamping jaw provided with an extension with an undercut recess formed in said jaw and extension and adapted to receive the flanged head of said plunger, and stops for limiting the movements of said clamping jaw upon said flanged head, substantially as described.

JONATHAN C. MELOON.

Witnesses:
W. H. THURSTON,
J. H. THURSTON.